US012500058B1

(12) United States Patent
Pol

(10) Patent No.: US 12,500,058 B1
(45) Date of Patent: Dec. 16, 2025

(54) RADIATION FOCAL SPOT TO PORT MEASUREMENT DEVICE, SYSTEM, AND METHOD

(71) Applicant: VAREX IMAGING CORPORATION, Salt Lake City, UT (US)

(72) Inventor: Pranit Pol, South Jordan, UT (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 0 days.

(21) Appl. No.: 19/222,457

(22) Filed: May 29, 2025

Related U.S. Application Data

(60) Provisional application No. 63/812,571, filed on May 27, 2025.

(51) Int. Cl.
*H01J 35/14* (2006.01)
*H01J 35/16* (2006.01)

(52) U.S. Cl.
CPC ............ *H01J 35/153* (2019.05); *H01J 35/14* (2013.01); *H01J 35/16* (2013.01)

(58) Field of Classification Search
CPC ................................ H01J 35/153; H01J 35/14
See application file for complete search history.

(56) References Cited

U.S. PATENT DOCUMENTS

2019/0051424 A1* 2/2019 Muehlhauser ....... A61B 6/4291

OTHER PUBLICATIONS

CN 103776400 B with English translation (Year: 2016).*
KR 20170019309 A with English translation (Year: 2017).*

* cited by examiner

*Primary Examiner* — Chih-Cheng Kao
(74) *Attorney, Agent, or Firm* — Dorsey & Whitney LLP

(57) ABSTRACT

Devices, systems, and methods for determining a distance between a focal spot and a port of a radiation source are disclosed. A method for determining a distance from a focal spot to a port in an X-ray tube can include attaching a fixture to an X-ray tube, generating X-rays by the X-ray tube, and calculating a distance from a focal spot to a port of the X-ray tube. An X-ray sensitive material on the fixture can be exposed to the X-rays generated by the X-ray tube through an opening in the fixture. The distance from the focal spot to the port of the X-ray tube can be calculated based on features of the opening detected by the X-ray sensitive material.

13 Claims, 8 Drawing Sheets

RADIATION FOCAL SPOT TO PORT MEASUREMENT DEVICE, SYSTEM, AND METHOD

CROSS REFERENCE TO RELATED APPLICATION

This application claims priority to U.S. Provisional Application No. 63/812,571, filed 27 May 2025, the entire disclosure of which is incorporated herein by reference.

FIELD

The described embodiments relate generally to radiation imaging systems and methods. More particularly, the described embodiments relate to devices, systems, and methods for determining a distance between a focal spot and a port of a radiation source.

BACKGROUND

Radiation imaging (e.g., projection radiography) is widely used for scanning internal structures of objects. In a medical setting, this can be used to create images of a body's internal structures, while in an industrial setting, this can be used to image internal structures in baggage, cars, cargo, other containers and objects, and the like. A system for performing radiation imaging can include a radiation source that produces radiation (e.g., X-rays), which is collimated towards a scanned object. A detector array can record attenuated radiation that passes through the scanned object. The extent of attenuation along each beam path of the radiation that passes through the scanned object can depend on the amount of material the radiation passes through and the type of material the radiation passes through.

The radiation source can generate radiation in an insert that can define an evacuated enclosure subject to vacuum conditions. The insert can be positioned within a housing that can include cooling fluids and the like. Radiation can be generated at a focal spot in the insert, can pass through a window defined in the insert, and can be emitted from a port in the housing. Accurately determining dimensions, distances, and positions of the components of the radiation source can be challenging.

SUMMARY

An aspect of the present disclosure relates to a method for determining a distance from a focal spot to a port in an X-ray tube. The method can include attaching a fixture to an X-ray tube, generating X-rays by the X-ray tube, and calculating a distance from a focal spot to a port of the X-ray tube. An X-ray sensitive material on the fixture can be exposed to the X-rays generated by the X-ray tube through an opening in the fixture. The distance from the focal spot to the port of the X-ray tube can be calculated based on features of the opening detected by the X-ray sensitive material.

In one or all examples, calculating the distance from the focal spot to the port of the X-ray tube can include detecting edges of the features of the opening, determining distances between the edges, and calculating the distance from the focal spot to the port of the X-ray tube based on measured dimensions of the fixture and the determined distances between the edges. In one or all examples, at least four edges of the features are detected. Distances between centerlines of the features can be determined based on the determined distances between the edges. The distance from the focal spot to the port of the X-ray tube can be calculated based on the determined distances between the centerlines of the features.

In one or all examples, the measured distances of the fixture can include a first offset distance between the X-ray tube and the features and a second offset distance between the features and the X-ray sensitive material. In one or all examples, the features can include a pair of elongated bodies. The measured distances of the fixture can include a distance between the pair of elongated bodies.

In one or all examples, the method can further include generating an X-ray image based on the X-rays received by the X-ray sensitive material, determining a resolution of the X-ray image, and repeating the generating of the X-rays in response to the resolution being less than a prescribed value.

Another aspect of the present disclosure relates to a non-transitory computer-readable medium storing code for determining a distance from a focal spot to a port in an X-ray tube. The code can include instructions executable by a processor to receive a calibration image from an X-ray detector, detect edges of objects in the calibration image, and calculate a distance from a focal spot to a port in an X-ray tube. The distance from the focal spot to the port in the X-ray tube can be calculated based on a distance between the detected edges of the objects.

In one or all examples, the code can further include instructions executable by the processor to determine a distance between centerlines of the objects in the calibration image based on the detected edges of the objects. The distance from the focal spot to the port can be calculated based on the distance between the centerlines of the objects. In one or all examples, the detected edges can extend in a first direction. The determined distance between the centerlines can extend in a second direction perpendicular to the first direction. The calculated distance from the focal spot to the port can extend in a third direction perpendicular to the first direction and the second direction.

In one or all examples, detecting the edges of the objects in the calibration image can include detecting at least four edges in the calibration image.

In one or all examples, the at least four edges can include a first edge, a second edge, a third edge, and a fourth edge. The distance between the centerlines of the objects in the calibration image is determined according to an equation:

$$D_1 = \frac{1}{2}(D_2) + D_3 + \frac{1}{2}(D_4)$$

where $D_1$ is the distance between the centerlines of the objects, $D_2$ is a distance between the first edge and the second edge, $D_3$ is a distance between the second edge and the third edge, and $D_4$ is a distance between the third edge and the fourth edge.

In one or all examples, calculating the distance from the focal spot to the port in the X-ray tube can be further based on dimensions of a fixture used to capture the calibration image. In one or all examples, the code can further include instructions executable by the processor to apply a filter to the calibration image before detecting the edges in the calibration image.

Yet another aspect of the present disclosure relates to a fixture for determining a distance from a focal spot to a port in an X-ray tube. The fixture can include a plate configured to receive an X-ray detector, a base configured to be secured to an X-ray tube, and a side support coupled between the plate and the base. The side support can be configured to space the X-ray detector apart from the X-ray tube. The plate and the base can define reference features for determining a distance from a focal spot to a port in the X-ray tube.

In one or all examples, the fixture can further include elongated bodies coupled to the base and extending across the opening in the base. In one or all examples, the elongated bodies can extend across the opening in the base in a first direction. The elongated bodies can be spaced apart from edges of the opening in the base in a second direction perpendicular to the first direction. In one or all examples, a material of the elongated bodies can include at least one of tungsten or aluminum. In one or all examples, two elongated bodies can extend across the opening in the base.

In one or all examples, the base can include openings configured to receive fasteners to secure the base to the X-ray tube. In one or all examples, the plate can include openings configured to receive fasteners to secure the plate to the X-ray detector.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
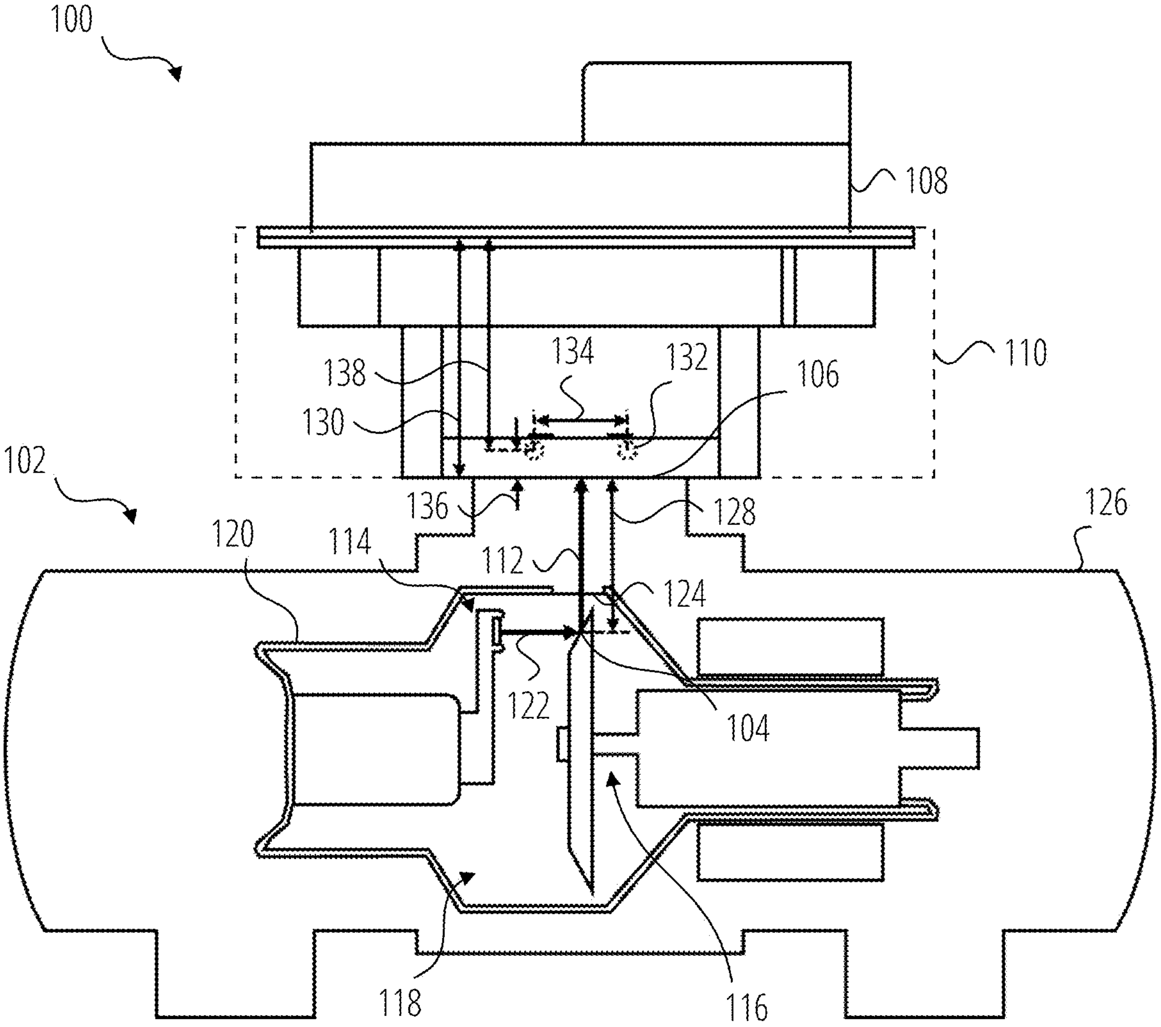
FIG. 1 illustrates a schematic view of a system for determining a distance from a focal spot to a port in an X-ray tube.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to radiation imaging systems and methods that can be used to scan or inspect internal structures of objects. Radiation imaging systems and methods can be used for imaging in a variety of contexts, including medical imaging, diagnostics, non-destructive testing, materials detection or analysis, security inspection, and the like. In a medical setting, radiation imaging systems and methods can be used to create images of a body's internal structures. In an industrial setting, radiation imaging systems and methods can be used to image internal structures in baggage, cars, cargo, other containers and objects, and the like.

More specifically, the following disclosure relates to systems and methods for determining a distance between a focal spot of a radiation source and a port of the radiation source. The focal spot of a radiation source is the point from which radiation is generated. The port of the radiation source is the point from which the radiation is emitted from the radiation source. The distance between the focal spot and the port can be important for positioning the radiation source within a radiation imaging system, and can impact image quality, image sharpness, beam intensity, beam shaping, and beam geometry; blur at edges in images produced by in response to radiation generated by the radiation source; patient safety through dose control; patient exposure to radiation; and the like.

Conventionally, the distance between the focal spot and the port of radiation detectors can be determined through film-based radiation detectors. Radiation images are analyzed by operators who make subjective measurement determinations, which are then used to determine the distance between the focal spot and the port for a radiation detector. These methods are time and labor intensive and can be relatively inaccurate.

The following disclosure provides a fixture that can be used to secure a radiation detector relative to a radiation source. The fixture can include reference features, such as a pair of elongated bodies or rods, which can be used to attenuate radiation generated by the radiation source and detected by the radiation detector. Projections of the elongated bodies can be detected by the radiation detector and analyzed to accurately determine the distance between the focal spot and the port of a radiation detector. The fixture can provide accurate, repeatable spacing between each of the radiation detector, the elongated bodies, and the radiation source. Measurements of the distances between the radiation source and the elongated bodies, between the elongated bodies, between the elongated bodies and the radiation detector, and between projections of the elongated bodies detected by the radiation detector can be used in an automated process to determine the distance between the focal spot and the port for the radiation detector. The fixture, the system including the radiation source, the fixture, and the radiation detector, and the method of determining the distance between the focal spot and the port for the radiation detector can be used to quickly and accurately determine the distance between the focal spot and the port. By accurately determining the distance between the focal spot and the port, the radiation source can be used to provide improved image quality, image sharpness, beam intensity, beam shaping, and beam geometry; reduced blur at edges in images produced by in response to radiation generated by the radiation source; improved patient safety through dose control; minimized patient exposure to radiation; and the like.

These and other examples are discussed below with reference to FIGS. 1 through 6. However, those skilled in the art will readily appreciate that the detailed description given herein with respect to these figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1 illustrates a schematic view of a system 100. The system 100 can be used to determine a distance from a focal spot 104 to a port 106 in an X-ray tube 102. The system 100 can include an X-ray detector 108 and a fixture 110. The fixture 110 can control the relative positions of and spacing between the X-ray tube 102 and the X-ray detector 108. The fixture 110 can include reference features, which can be used to determine the distance from the focal spot 104 to the port 106 in the X-ray tube 102.

The X-ray tube 102 can be used to generate an X-ray beam 112. Representative applications for X-ray beams 112 include, but are not limited to, imaging, medicine, diagnostics, radiology, radiotherapy, radiography and tomography, and a range of industrial X-ray technologies. The X-ray tube 102 can include a cathode 114 and an anode 116 positioned within an evacuated enclosure 118 defined by an insert 120. A high voltage can be applied between the cathode 114 and the anode 116 such that an electron beam 122 is emitted from the cathode 114 towards a target surface on the anode 116. X-rays can be generated as the electrons from the electron beam 122 impact the target surface on the anode 116 and the X-ray beam 112 can be emitted from the insert 120 through an X-ray window 124 defined in the insert 120. The insert 120 can be positioned within a housing 126, which can be a metal enclosure that can protect and support the insert 120, provide shielding for any excess or undesired radiation (e.g., X-rays) emitted from the insert 120, and provide electrical insulation and cooling to the insert 120. The X-ray beam 112 can be emitted from the X-ray tube 102 through a port 106 defined in the housing 126.

The X-rays can be generated at a focal spot 104 on the target surface of the anode 116 where the electron beam 122 strikes the target surface. The focal spot 104 can be separated from the port 106 where the X-ray beam 112 exits the X-ray tube 102 by a focal spot to port distance 128. The focal spot to port distance 128 can be an important dimension of the X-ray tube 102, as the focal spot to port distance 128 can impact the geometry and characteristics of the X-ray beam 112. For example, the focal spot to port distance 128 can impact the resolution, sharpness, and clarity of images generated in response to detection of the X-ray beam 112; collimation of the X-ray beam 112; and the beam intensity of the X-ray beam 112 and radiation dose provided by the X-ray beam 112. The focal spot to port distance 128 can also impact characteristics of the X-ray tube 102, such as heat dissipation in the X-ray tube 102.

Conventionally, it can be difficult to measure the distance between the focal spot 104 and the port 106 (e.g., the focal spot to port distance 128). The focal spot to port distance 128 can depend on the arrangement and positioning of the cathode 114 and the anode 116 within the insert 120, the arrangement and positioning of the insert 120 within the housing 126, and the like. It can be challenging to measure distances within the housing 126, and within the insert 120, which can be under vacuum conditions. Some methods for calculating the focal spot to port distance 128 exist, but these are typically manual, time consuming, rely on subjective determinations made by operators, and are relatively inaccurate. Providing an inaccurate focal spot to port distance 128 for the X-ray tube 102 can result in reduced image quality, reduced image sharpness, increased blur at edges in images produced with the X-ray tube 102, inaccurate beam intensity, undesirable beam shaping, inaccurate radiation dose (and excess radiation exposure to patients), inaccurate results from X-ray imaging, and the like.

The system 100 can be used to determine the focal spot to port distance 128 accurately, which can be used to accurately space the X-ray tube 102 relative to objects, subjects, patients, radiation detectors, and the like subjected to X-ray beams 112 produced by the X-ray tube 102. This can be used to improve image quality, image sharpness, beam intensity, beam shaping, and beam geometry; reduce blur at edges in images produced by the X-ray beams 112; provide improved patient safety through dose control; minimize patient exposure to radiation; and the like. In other words, when the X-ray tube 102 is installed in an X-ray system, the focal spot to port distance 128 can be used to calibrate the X-ray system (e.g., through accurately spacing of components of the X-ray system, including the X-ray tube 102). This can provide the X-ray system with optimized image resolution and sharpness; improved beam intensity and geometry; improved patient safety through does control; reduced penumbra effects (e.g., reduced blur at the edges of objects in images), improved heat dissipation and tube efficiency. This can ensure high-quality imaging, effective treatment planning, and minimizing radiation exposure to patients.

As illustrated in FIG. 1, the fixture 110 can be coupled to the X-ray tube 102 and the X-ray detector 108. The fixture 110 can control the relative positions of and spacing between the X-ray tube 102 and the X-ray detector 108. For example, the fixture 110 can separate a surface of the X-ray detector 108 from the port 106 of the X-ray tube 102 by a distance 130. The distance 130 can be a known or measured value, which can be used in determining the focal spot to port distance 128. The fixture 110 can include reference features, which can be used in determining the focal spot to port distance 128. For example, the fixture 110 can include a pair of elongated bodies or rods 132. A distance 134 between the rods 132, a distance 136 from the port 106 to the rods 132, and a distance 138 from the rods 132 to the X-ray detector 108 can also be known or measured values, which can be used in determining the focal spot to port distance 128. Additional details of the fixture 110 and methods for determining the focal spot to port distance 128 based on dimensions of the fixture 110 are discussed below.

The focal spot to port distance 128 can be determined by generating the X-ray beam 112 with the X-ray tube 102 such that the X-ray beam 112 passes through and is attenuated by the fixture 110 and detecting the attenuated radiation of the X-ray beam 112 by the X-ray detector 108. In other words, the X-ray detector 108 can be exposed to and detect attenuated X-rays of the X-ray beam 112. The X-ray beam 112 can specifically be attenuated by the rods 132 of the fixture 110. Edges of the rods 132 and the spacing between the rods 132 can be examined in an image produced by the X-ray detector 108 and can be used to determine the focal spot to port distance 128. The X-ray detector 108 can include an X-ray sensitive material, which can be used to detect X-rays from the X-ray beam 112. The X-ray detector 108 can be an example of or include the components of a flat panel detector, a film-based detector, a computed radiography (CR) detector, a photon counting detector (PCD), another type of radiation detector, or the like.

Figure 2A:
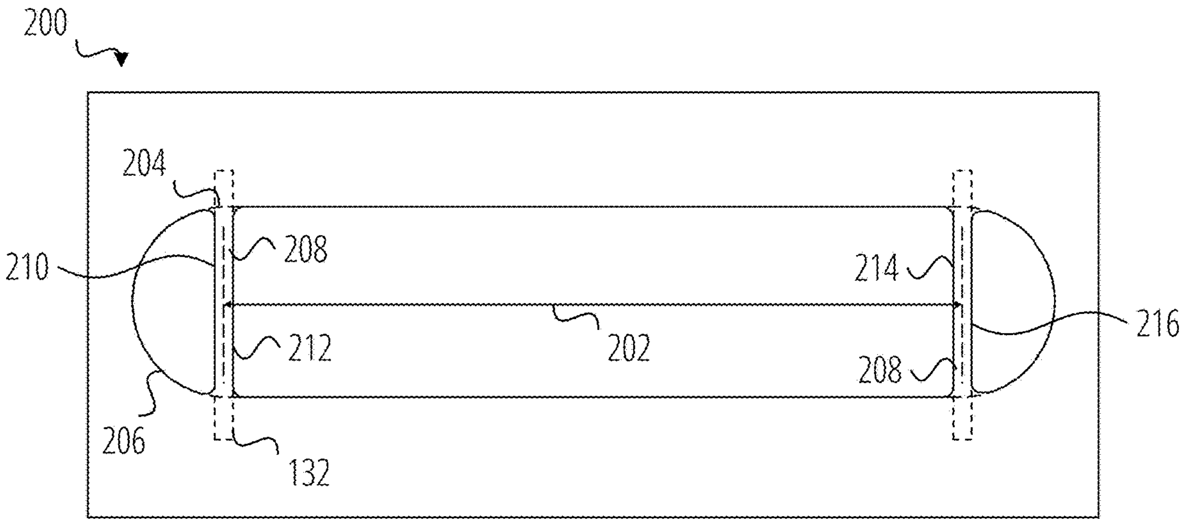
FIG. 2A illustrates an image captured by an X-ray detector and used for determining a distance from a focal spot to a port in an X-ray tube.
Figure 2B:
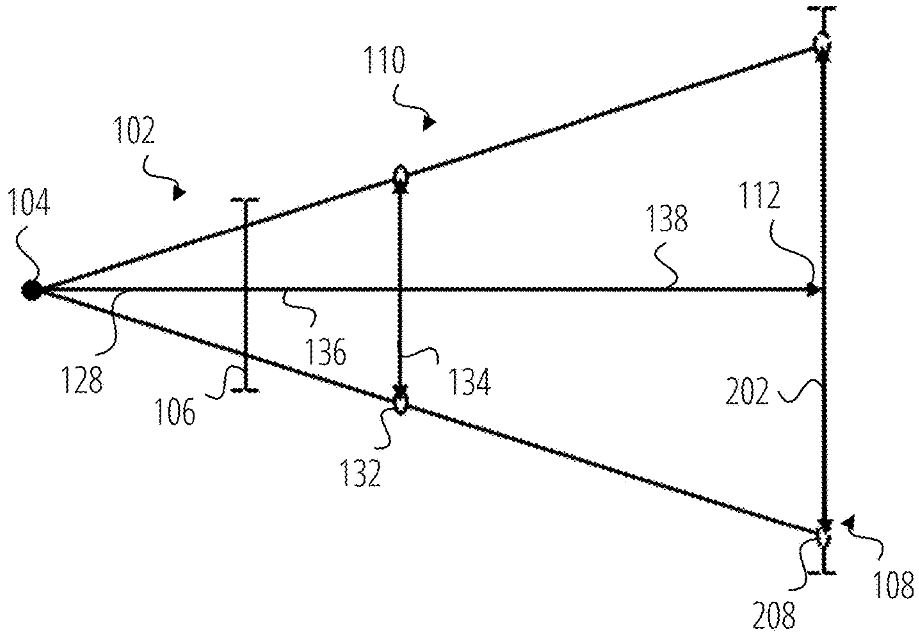
FIG. 2B illustrates a schematic view of dimensions of an X-ray tube and a fixture used for determining a distance from a focal spot to a port in an X-ray tube.

FIGS. 2A and 2B illustrate a method of determining the focal spot to port distance 128 for the X-ray tube 102. FIG. 2A illustrates an image 200 that can be captured by the X-ray detector 108. FIG. 2B illustrates a schematic view of dimensions of the X-ray tube 102 and the fixture 110 that can be used to calculate the focal spot to port distance 128.

As illustrated in FIGS. 2A and 2B, an X-ray beam 112 can be projected from the focal spot 104 of the X-ray tube 102, through the port 106, through the fixture 110, and towards the X-ray detector 108. The X-ray beam 112 can be attenuated by reference features of the fixture 110, and the attenuated X-ray beam 112 can be detected by the X-ray detector 108. In other words, the X-ray detector 108 can be exposed to and detect attenuated X-rays of the X-ray beam 112. The image 200 can be produced by the X-ray detector 108 in response to the attenuated radiation of the X-ray beam 112 detected by the X-ray detector 108.

The image 200 can be analyzed to determine a distance 202 between the reference features of the fixture 110 at the X-ray detector 108. The distance 202 can then be used along with measured or known dimensions of the fixture 110 to determine the focal spot to port distance 128. The distance 202 and the dimensions of the fixture 110 can be determined accurately such that the focal spot to port distance 128 is also determined accurately. An accurate focal spot to port distance 128 can be used with the X-ray tube 102 to improve image quality, image sharpness, beam intensity, beam shaping, and beam geometry; reduce blur at edges in images produced by the X-ray beams 112; provide improved patient safety through dose control; minimize patient exposure to radiation; and the like. The image 200 can be analyzed automatically, through software (discussed in detail below), which can improve the accuracy of the distance 202 obtained based on the image 200 and the speed at which the distance 202 is obtained.

The fixture 110 can include features that define reference features that are used to determine the focal spot to port distance 128. For example, the fixture 110 can define an opening 204 through which the X-ray beam 112 passes. Edges of the opening 204 can be defined by a material that is relatively radiopaque to the X-ray beam 112 such that the X-ray beam 112 passes through the opening 204 and is attenuated or blocked outside the opening 204. The opening 204 can have any suitable shape, such as have a shape of a capsule, a rectangle, a rectangle with curved corners, an oval, a circle, another elongated shape, or any other suitable shape.

The fixture 110 can include rods 132 that extend across the opening 204. The rods 132 can include any elongated bodies, such as cylinders, prisms, or the like. The rods 132 can include two rods 132, which can be positioned parallel to one another. The rods 132 can extend parallel to one another in a first direction. The rods 132 can extend across the opening 204 in the first direction (e.g., parallel to longitudinal axes of the rods 132), and can be separated or spaced apart from edges of the opening 204 and one another in a second direction perpendicular to the first direction. The second direction can also be perpendicular to a third direction in which X-ray beam 112 is projected through the opening 204. By spacing the rods 132 from the edges of the opening 204 in the second direction, both edges of each of the rods 132 are visible through the opening 204 (e.g., when viewed from the perspective of the X-ray tube 102, illustrated in FIG. 3E), and both edges of each of the rods 132 can be projected towards the X-ray detector 108. Thus, both edges of each of the rods 132 can be captured in the image 200.

The rods 132 can be formed from materials that are relatively radiopaque. This ensures that the rods 132 attenuate or block the X-ray beam 112 as the X-ray beam 112 passes through the fixture 110 and the edges of the rods 132 can be detected in the image 200. The rods 132 can be formed from materials that produce relatively sharp edges in the image 200, which improves the accuracy of the detection of edges of the rods 132 in the image 200 and improves the accuracy of the determination of the distance 202. For example, the rods 132 can be formed from metals, such as tungsten, tungsten carbide, other tungsten alloys, gold, platinum, iridium, bismuth, tin, lead, steel, aluminum, or the like.

As illustrated in FIG. 2A, the X-ray detector 108 can detect a projection 206 of the opening 204 and projections 208 of the rods 132 in the image 200. The distance 202 between the projections 208 of the rods 132 can be determined by detecting two edges of each of the projections 208 of the rods 132. For example, a first edge 210 (e.g., a left edge) and a second edge 212 (e.g., a right edge) of the left projection 208 of the left rod 132 and a third edge 214 (e.g., a left edge) and a fourth edge 216 (e.g., a right edge) of the right projection 208 of the right rod 132 can be detected. The distance 202 between the projections 208 of the rods 132 can be determined according to the following equation:

$$D_1 = \frac{1}{2}(D_2) + D_3 + \frac{1}{2}(D_4) \tag{1}$$

where $D_1$ is the distance 202, $D_2$ is the distance between the first edge 210 and the second edge 212, $D_3$ is the distance between the second edge 212 and the third edge 214, and $D_4$ is the distance between the third edge 214 and the fourth edge 216. D, $D_1$, $D_2$, and $D_3$ can be measured in the second direction, which is perpendicular to the first direction in which the edges 210, 212, 214, 216 extend.

Once the distance 202 is determined, the focal spot to port distance 128 can be determined based on the distance 202 and dimensions of the fixture 110. The focal spot to port distance 128 can be determined according to the following equation:

$$Y = \frac{(DA + DB - CA)}{(C - D)} \tag{2}$$

where Y is the focal spot to port distance 128, A is the distance 136 between the port 106 and centerlines of the rods 132 measured in the third direction parallel to a central ray of the X-ray beam 112, B is the distance 138 between the centerlines of the rods 132 and a surface of the X-ray detector 108 measured in the third direction, D is half the distance 134 between the centerlines of the rods 132 measured in the first direction perpendicular to the third direction, and C is half the distance 202 between the centerlines of the projections 208 of the rods 132 measured in the first direction perpendicular to the third direction and detected by the X-ray detector 108. The distance 134 between the centerlines of the rods 132 can be determined according to the same equation as the distance 202 between the projections 208 of the rods 132 (e.g., Equation 1). Each of the distances 134, 136, 138 can be measured or known based on the arrangement of components of the fixture 110, as will be discussed in detail below.

Figure 3A:
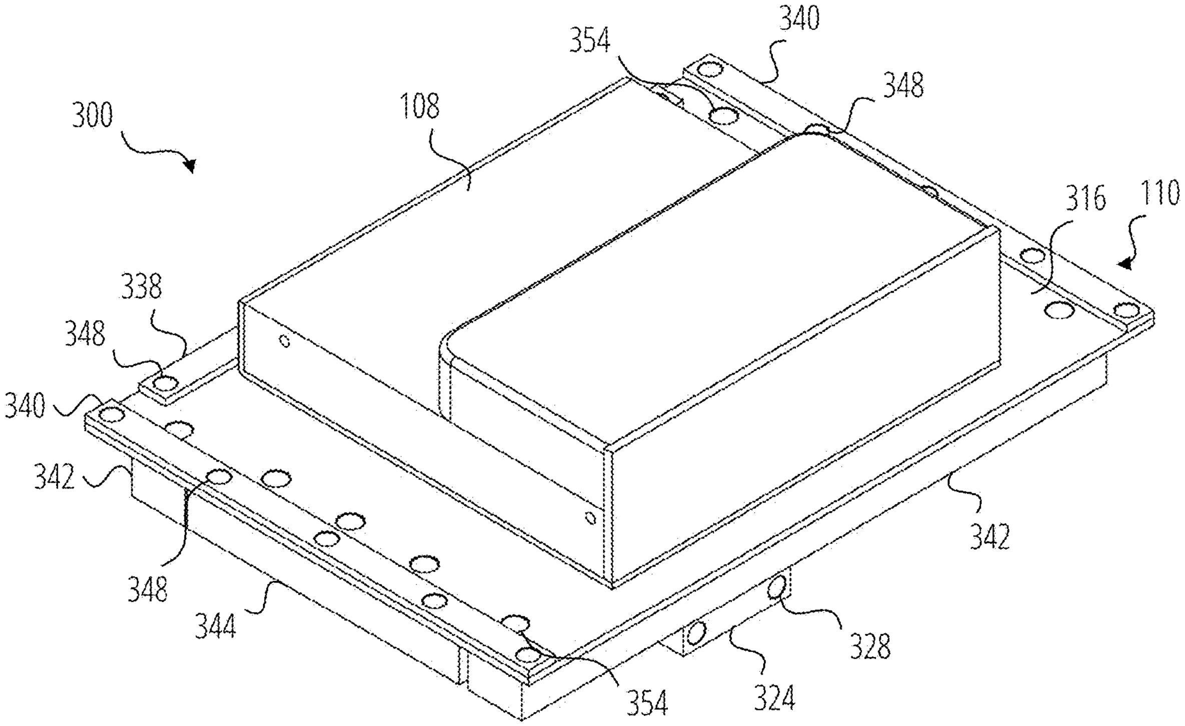
FIG. 3A illustrates a perspective view of an X-ray detector and a fixture for determining a focal spot-to-port distance for an X-ray tube.
Figure 3B:
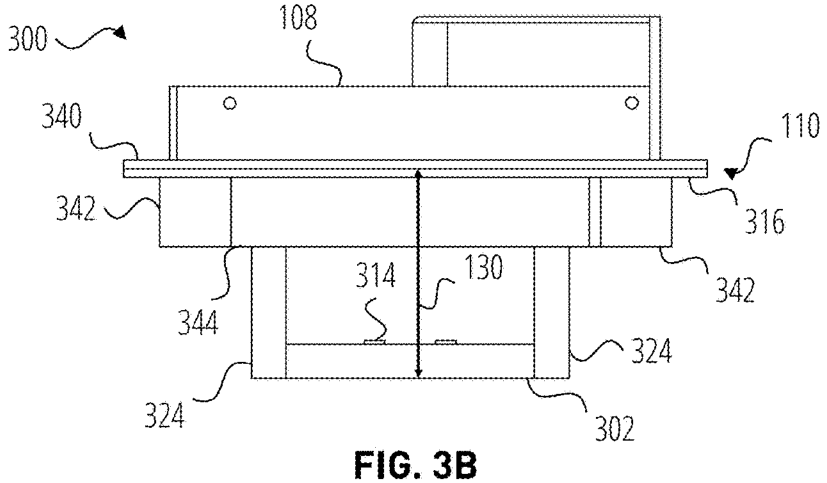
FIG. 3B illustrates a front-to-back view of the X-ray detector and fixture of FIG. 3A.
Figure 3C:
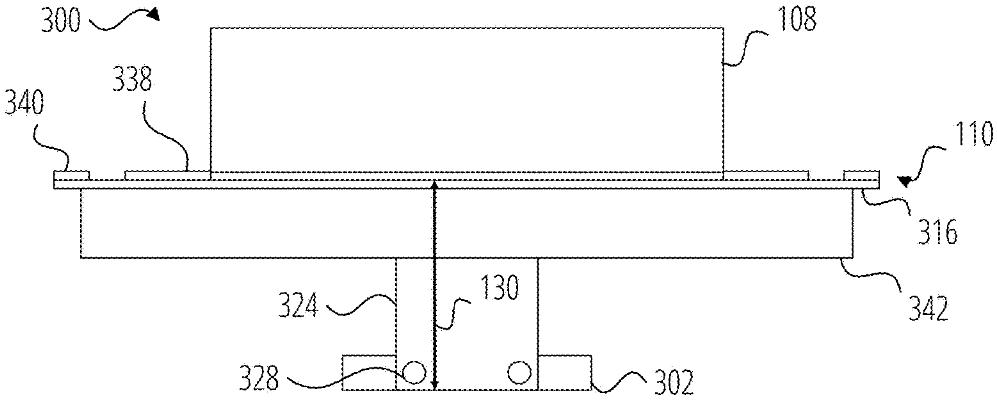
FIG. 3C illustrates a right-side view of the X-ray detector and fixture of FIG. 3A.
Figure 3D:
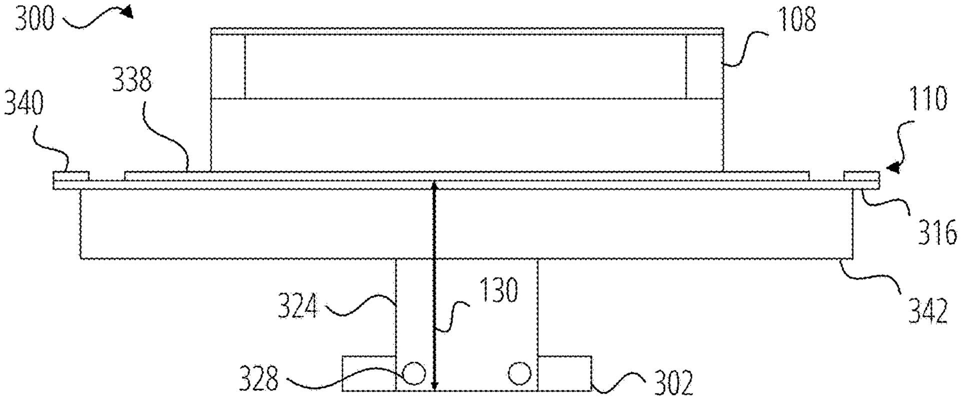
FIG. 3D illustrates a left-side view of the X-ray detector and fixture of FIG. 3A.
Figure 3E:
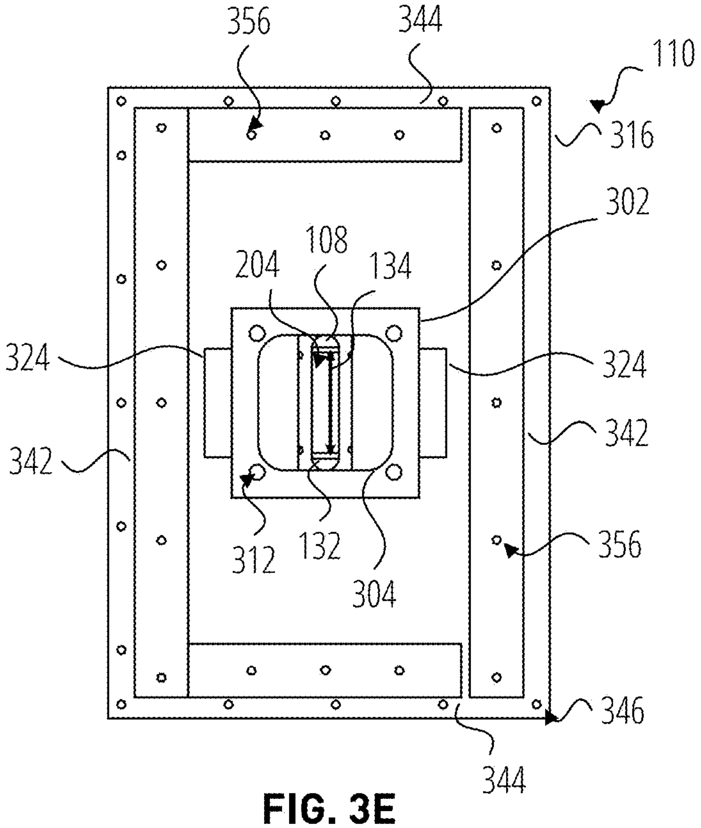
FIG. 3E illustrates a bottom-up view of the X-ray detector and fixture of FIG. 3A.
Figure 3F:
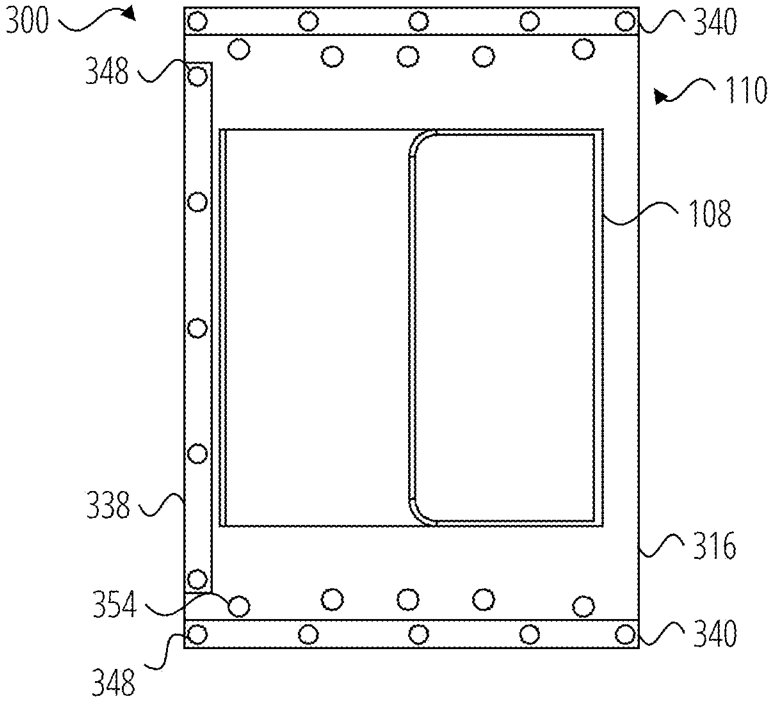
FIG. 3F illustrates a top-down view of the X-ray detector and fixture of FIG. 3A.
Figure 3G:
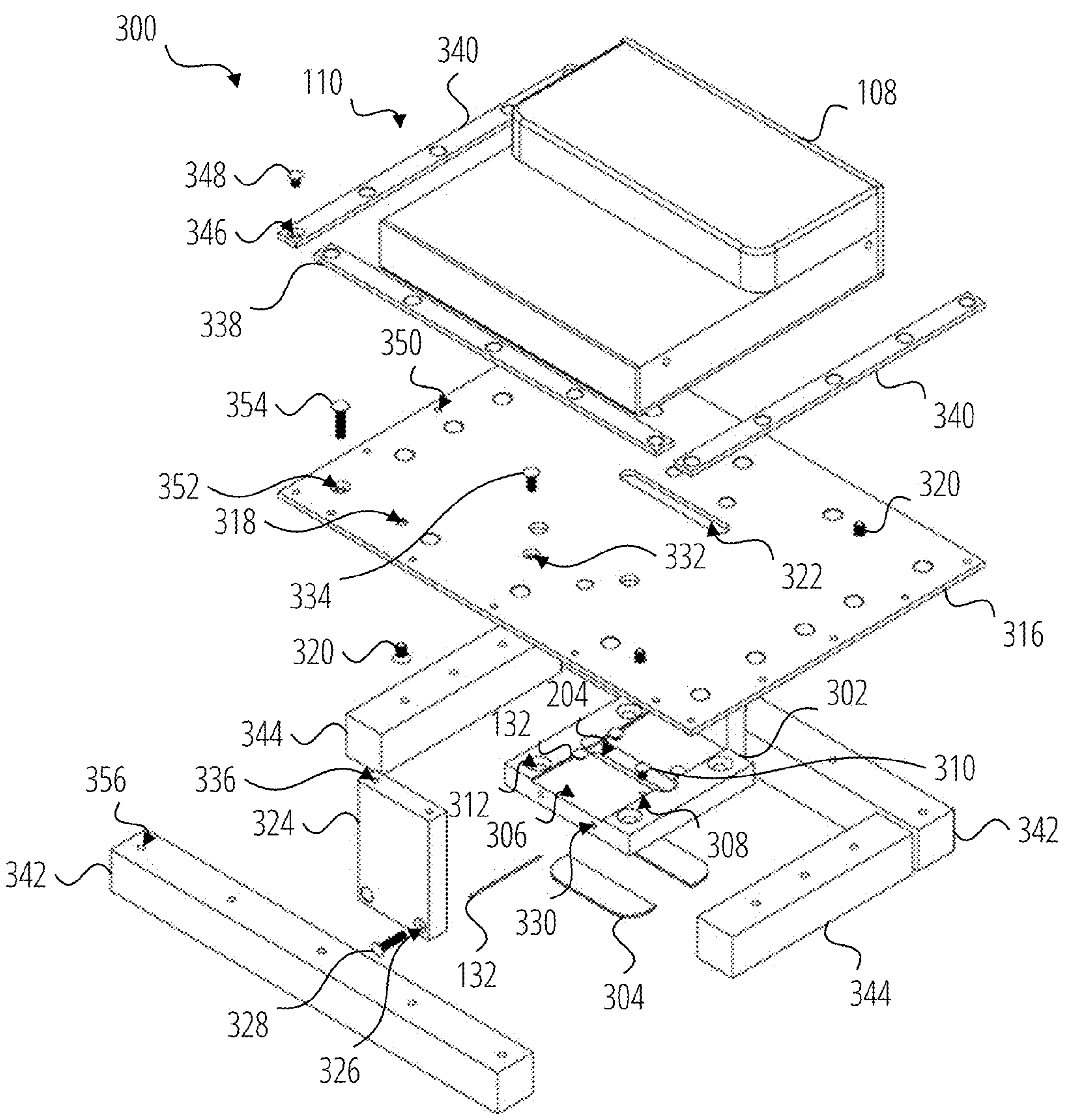
FIG. 3G illustrates an exploded view of the X-ray detector and fixture of FIG. 3A.

FIGS. 3A through 3G illustrate various views of a measurement system 300. FIG. 3A is a perspective view, FIG. 3B is a front-to-back view, FIG. 3C is a right-side view, FIG. 3D is a left-side view, FIG. 3E is a bottom-up view, FIG. 3F is a top-down view, and FIG. 3G is an exploded view of the measurement system 300. The measurement system 300 can include the X-ray detector 108 and the fixture 110 of FIG. 1. FIGS. 3A through 3G illustrate additional details of the fixture 110.

The fixture 110 can include a base 302, which can define reference features used to determine the focal spot to port distance 128. For example, the base 302 can include rods 132, which can be positioned across an opening 204. In other words, the opening 204, discussed above in reference to FIGS. 2A and 2B, can be defined in the base 302. An X-ray beam (e.g., the X-ray beam 112) emitted from an X-ray tube (e.g., the X-ray tube 102) to which the fixture 110 is attached can pass through the opening 204. Edges of the opening 204 can be defined by a material of the base 302 that is relatively radiopaque to the X-ray beam 112 such that the X-ray beam 112 passes through the opening 204 and is attenuated or blocked outside the opening 204. The opening 204 can have any suitable shape, such as have a shape of a capsule, a rectangle, a rectangle with curved corners, an oval, a circle, another elongated shape, or any other suitable shape.

In one or all examples, the opening 204 in the base 302 (or the projection 208 of the opening 204) can be at least partially defined by shields 304. The shields 304 can be coupled to the base 302 on opposite sides of the opening 204. The shields 304 can include two shields 304, which can be positioned symmetrically relative to one another. The shields 304 can be formed from materials that are relatively radiopaque. This ensures that the shields 304 attenuate or block radiation as the radiation passes through the fixture 110. For example, the shields 304 can be formed from metals, such as tungsten, tungsten carbide, other tungsten alloys, gold, platinum, iridium, bismuth, tin, lead, steel, aluminum, or the like.

The rods 132 can extend across the opening 204. The rods 132 can include any elongated bodies, such as cylinders, prisms, or the like. The rods 132 can include two rods 132, which can be positioned parallel to one another. The rods 132 can extend parallel to one another in a first direction. The rods 132 can extend across the opening 204 in the first direction (e.g., parallel to longitudinal axes of the rods 132), and can be separated or spaced apart from edges of the opening 204 and one another in a second direction perpendicular to the first direction. The second direction can also be perpendicular to a third direction in which X-ray beam 112 is projected through the opening 204. By spacing the rods 132 from the edges of the opening 204 in the second direction, both edges of each of the rods 132 are visible through the opening 204 (e.g., when viewed from the perspective of the X-ray tube 102, illustrated in FIG. 3E), and both edges of each of the rods 132 can be projected towards the X-ray detector 108. Thus, both edges of each of the rods 132 can be captured in an image produced by the X-ray detector 108 (e.g., the image 200).

A channel 306 and threaded openings 308 can be defined in the base 302 to position and secure the rods 132 relative to the base 302. The rods 132 can be secured to the base 302 by fasteners 310. The fasteners 310 can include bolts, screws, or other threaded fasteners, which can be screwed into the threaded openings 308. The fasteners 310 can secure the rods 132 between the fasteners 310 and the channel 306. In one or all examples, the fasteners 310 can be flat head fasteners that have angled heads adjacent to the rods 132. The angled heads of the fasteners 310 can press each of the rods 132 against a side surface and a bottom surface of the channel 306 to secure the rods 132 in the channel 306. As such, a distance between opposite side surfaces of the channel 306 and diameters or widths of the rods 132 can control the spacing between centerlines of the rods 132 (e.g., the distance 134). A thickness of the base 302 between the rods 132 and a surface of the base 302 to which an X-ray tube 102 can be coupled and diameters or thicknesses of the rods 132 can control the spacing between the rods 132 and the port 106 of the X-ray tube 102. Thus, the distance 136 between the port 106 and centerlines the rods 132 can be controlled based on the thickness of the base 302 between the channel 306 and a surface of the base 302 opposite the channel 306 and characteristics of the rods 132. In other words, the distance 136 can be determined or controlled based on the thickness of the base 302, the depth of the channel 306, and the dimensions (e.g., the thicknesses or diameters) of the rods 132.

The base 302 can couple the fixture 110 to the X-ray tube 102. The base 302 can include openings 312 through which fasteners 314 can extend. The fasteners 314 can be coupled to the X-ray tube 102. The fasteners 314 can include bolts, screws, or other threaded fasteners, which can be positioned through each of the openings 312 and screwed into threaded openings in the X-ray tube 102 to secure the fixture 110 to the X-ray tube 102.

The fixture 110 can include a plate 316 to which the X-ray detector 108 can be coupled. The plate 316 can include openings 318 through which fasteners 320 can extend. The fasteners 320 can be coupled to the X-ray detector 108. The fasteners 320 can include bolts, screws, or other threaded fasteners, which can be positioned through each of the openings 318 and screwed into threaded openings in the X-ray detector 108 to secure the X-ray detector 108 to the fixture 110. The plate 316 can include an opening 322 that can be aligned with the opening 204 of the base 302. The opening 322 can allow X-rays that pass through the opening 204 and are not attenuated or blocked by the rods 132 to pass through the plate 316 to the X-ray detector 108. The rods 132, the opening 204, and the opening 322 can be involved in allowing X-rays to pass through the base 302 and the plate 316 and attenuating the X-rays, and each can be referred to as a reference feature. Further, each of the reference features can be used in determining the focal spot to port distance 128 and can be configured to determine the focal spot to port distance 128.

The fixture 110 can include two side supports 324 that can couple the plate 316 to the base 302. The length of the side supports 324 can control the spacing between the plate 316 and the base 302. The length of the side supports 324 and the thickness of the plate 316 can control the spacing between the X-ray detector 108 and the X-ray tube 102. In other words, the distance 130 between the port 106 and the X-ray detector 108 can be controlled based on the length of the side supports 324 and the thickness of the plate 316. The distance 138 between centerlines of the rods 132 and the X-ray detector 108 can be controlled based on the length of the side supports 324, the depth of the channel 306, the dimensions (e.g., the thicknesses or diameters) of the rods 132, and the thickness of the plate 316. In the example illustrated in FIGS. 3A through 3G, surfaces of the side supports 324 are level with a surface of the base 302 to which an X-ray tube 102 can be coupled. In one or all examples, the surfaces of the side supports 324 can be offset from the surface of the base 302 to which an X-ray tube 102 can be coupled and the thickness of the base 302 can also contribute to the distances 130, 138.

Each of the distances 130, 134, 136, 138 can be controlled by dimensions of components of the fixture 110. The distances 130, 134, 136, 138 can be measured from the fixture 110, can be measured from the components of the fixture 110, or can be determined based on manufacturing specifications of the components of the fixture 110. As described above in reference to FIGS. 2A and 2B, a distance 202 can be determined based on an image 200 produced from the X-ray detector 108 in response to an X-ray beam 112 generated by the X-ray tube 102 that travels through and is attenuated by the fixture 110. The distances 134, 136, 138 can be used with the distance 202 to accurately determine the focal spot to port distance 128 for the X-ray tube 102. This accurate focal spot to port distance 128 can then be used with the X-ray tube 102 in radiation systems to provide improved image quality, image sharpness, beam intensity, beam shaping, and beam geometry; reduced blur at edges in images produced by in response to radiation generated by the radiation source; improved patient safety through dose control; minimized patient exposure to radiation; and the like.

Each of the side supports 324 can include openings 326 through which fasteners 328 can extend. The fasteners 328 can be coupled to the base 302. The fasteners 328 can include bolts, screws, or other threaded fasteners, which can be positioned through each of the openings 326 and screwed into threaded openings 330 in the base 302 to secure the side supports 324 to the base 302. The plate 316 can include openings 332 through which fasteners 334 can extend. The fasteners 334 can be coupled to the side supports 324. The fasteners 334 can include bolts, screws, or other threaded fasteners, which can be positioned through each of the openings 332 and screwed into threaded openings 336 in the side supports 324 to secure the plate 316 to the side supports 324.

The fixture 110 can further include various components that can strengthen and support the fixture 110 and can be used to space the components of the fixture 110 relative to one another. For example, the fixture 110 can include a long rail 338, two short rails 340, two long supports 342, and two short supports 344 coupled to the plate 316. The long rail 338 and the short rails 340 can include openings 346 through which fasteners 348 can extend. The fasteners 348 can be coupled to the plate 316. The fasteners 348 can include bolts, screws, or other threaded fasteners, which can be positioned through each of the openings 346 and screwed into threaded openings 350 in the plate 316 to secure the long rail 338 and the short rails 340 to the plate 316. The plate 316 can include openings opening 352 through which fasteners 354 can extend. The fasteners 354 can be coupled to the long supports 342 and the short supports 344. The fasteners 354 can include bolts, screws, or other threaded fasteners, which can be positioned through each of the openings 352 and screwed into threaded openings 356 in the long supports 342 and the short supports 344 to secure the plate 316 to the long supports 342 and the short supports 344.

Figure 4:
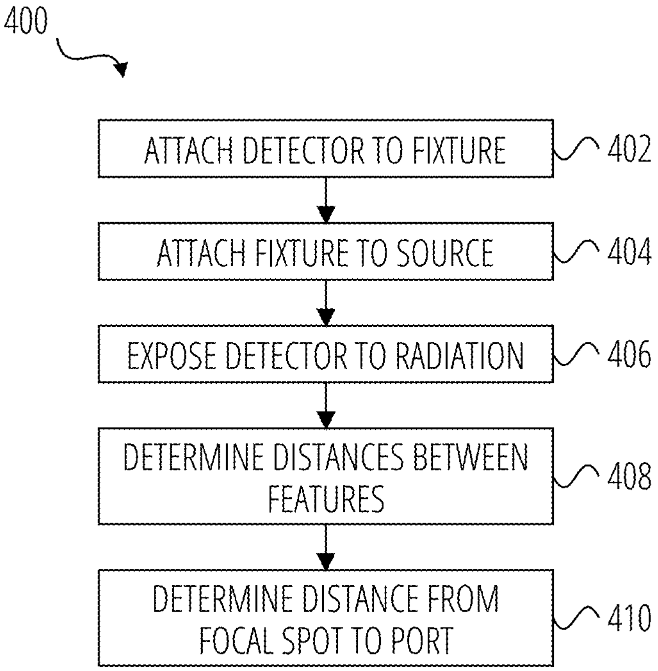
FIG. 4 illustrates a block diagram of a method for determining a distance from a focal spot to a port in an X-ray tube.

FIG. 4 illustrates a block diagram of a method 400 of determining a distance from a focal spot to a port in a radiation source. The method 400 can be performed with the system 100 of FIG. 1 and the measurement system 300 of FIGS. 3A through 3G and can produce and utilize the image 200 of FIG. 2A. The method 400 can include a block 402 in which a radiation detector is attached to a fixture; a block 404 in which the fixture is attached to a radiation source; a block 406 in which the radiation detector is exposed to radiation; a block 408 in which a distance between features in a radiation image is determined; and a block 410 in which the distance from the focal spot to the port of the radiation source is determined.

In block 402, a radiation detector is attached to a fixture. The X-ray detector 108 is an example of the radiation detector and the fixture 110 is an example of the fixture. The radiation detector can include a radiation sensitive material and can be any suitable type of radiation detector, such as a flat panel detector, a film-based detector, a computed radiography (CR) detector, a photon counting detector (PCD), another type of radiation detector, or the like.

The fixture can control the relative positions of and spacing between the radiation detector and a subsequently attached radiation source. The fixture can include reference features, which can be used in determining the distance from the focal spot to the port of the radiation source. For example, the fixture can include a pair of elongated bodies or rods. The rods 132 are an example of the elongated bodies or rods. Distances between centerlines of the elongated bodies, between the centerlines of the elongated bodies and the surface to which the radiation detector is attached, and between the centerlines of the elongated bodies and the surface to which the radiation source is attached can be precisely and accurately measured, known, or determined, and can be used to determine the distance from the focal spot to the port of the radiation source.

In block 404, the fixture is attached to a radiation source. The radiation source can be an X-ray tube, such as the X-ray tube 102, which can be used to generate X-rays. The radiation source can generate a radiation beam, which can be directed through the fixture. The radiation source can generate the radiation beam at a focal spot and the radiation beam can travel a distance before the radiation beam exits the radiation source at a port. The fixture can separate the X-ray detector from the port of the radiation source by a distance.

The distance between the focal spot and the port of the radiation source can impact various characteristics of the emitted radiation beam. Accurately determining the distance between the focal spot and the port can improve various aspects of a system in which the radiation source is utilized. The distance between the focal spot and the port of the radiation source can be difficult to determine accurately, as components of the radiation source are positioned close to one another, can be within a vacuum, can be filled with cooling fluids, and the like. An accurate determination of the distance between the focal spot and the port can be used to provide improved image quality, image sharpness, beam intensity, beam shaping, and beam geometry; reduced blur at edges in images produced by in response to radiation generated by the radiation source; improved patient safety through dose control; minimized patient exposure to radiation; and the like.

In block 406, the radiation detector is exposed to radiation. The radiation can be generated by the radiation source. The radiation can be emitted from the port of the radiation source, through the fixture, and can be attenuated by features of the fixture (e.g., the elongated bodies). The attenuated radiation can be detected by the radiation detector and can be used to generate a radiation image. The radiation image can be used to calculate the distance between the focal spot and the port of the radiation source and can be referred to as a calibration image. In examples in which the radiation detector is a digital radiation detector, the radiation image can be a digital image produced based on radiation detected by pixels of the radiation detector. In examples in which the radiation detector is a film-based detector, the film can be exposed and scanned to produce a digital image based on radiation received by the film. The radiation image can include projections of the elongated bodies.

In block 408, a distance between features in a radiation image is determined. The distance between features in the radiation image that is determined can include a distance between centerlines of the projections of the elongated bodies, which can be used to determine the distance from the focal spot to the port of the radiation source.

Determining the distance between the features in the radiation image can generally include steps of pre-processing the radiation image, detecting edges in the radiation image, determining coordinates for the edges in the radiation image, determining distances between the edges in the radiation image, and determining a distance between centerlines of objects in the radiation image. Pre-processing the radiation image can be used to reduce noise, increase contrast, reduce variation, and the like in the radiation image, while preserving or enhancing edges in the radiation image. A low-pass filter can be applied to the radiation image to smooth the radiation image and reduce noise in the radiation image. A dilution filter or dilated filter can be applied to the radiation image to smooth the radiation image, while maintaining edge definition in the radiation image. The dilated filter can also help to connect broken edges in the radiation image. A Gaussian filter can be applied to the radiation image to reduce noise in the radiation image and blur subtle variations in the radiation image. A bilateral filter can be applied to the radiation image to reduce noise, while preserving edges in the radiation image.

The edges in the radiation image can be detected using an edge detection operator or algorithm, such as a Canny edge detector, a Sobel edge detector, a Prewitt edge detector, a Laplacian edge detector, or the like. Specifically, edges of projections (e.g., the projections 208) of elongated bodies (e.g., the rods 132) can be detected in the radiation image (e.g., the image 200). Each of the edges of the projections of the elongated bodies can extend generally in a first direction parallel to one another. The coordinates of the edges can be determined. Based on the coordinates of the edges, distances between the edges of the projections of the elongated bodies can be determined. The distances can be determined in a second direction perpendicular to the first direction. The determined distances can include a distance between a left edge of a left projection and a right edge of the left projection, a distance between the right edge of the left projection and a left edge of a right projection, and a distance between the left edge of the right projection and a right edge of the right projection. These distances can then be used to determine the distance between the centerlines of the projections of the elongated bodies in the radiation image. Equation 1, above, can be used to determine the distance between the centerlines of the projections of the elongated bodies in the radiation image.

In block 410, the distance from the focal spot to the port of the radiation source is determined. The distance from the focal spot to the port of the radiation source can be calculated based on dimensions of the fixture and the distance determined in block 408. The dimensions of the fixture that can be used to determine the distance from the focal spot to the port of the radiation source can include the distance from the port to centerlines of the elongated bodies (e.g., the distance 136), the distance between the centerlines of the elongated bodies in the fixture (e.g., the distance 134), and the distance between the centerlines of the elongated bodies and the radiation detector (e.g., the distance 138). Equation 2, above, can then be used with the dimensions of the fixture and the determined distance between the centerlines of the left projection of the left elongated body and the right projection of the right elongated body from the radiation image to calculate the distance from the focal spot to the port of the radiation source.

The distance from the focal spot to the port of the radiation source can be calculated accurately, such as with an accuracy greater than about 90%, greater than about 95%, greater than about 98%, or the like. The radiation source can operate with some variation in voltage and current, which can reduce the accuracy of the calculated distance from the focal spot to the port of the radiation source. By accurately determining the distance between the focal spot and the port, the radiation source can be used to provide improved image quality, image sharpness, beam intensity, beam shaping, and beam geometry; reduced blur at edges in images produced by in response to radiation generated by the radiation source; improved patient safety through dose control; minimized patient exposure to radiation; and the like. In one or all examples, the blocks 408 and 410 can be automated, which can improve both the speed and accuracy of the distance between the focal spot and the port.

In one or all examples, a determination can be made as to the resolution of the radiation image, and one or more steps of the method 400 can be repeated if the resolution of the radiation image is below a prescribed value. For example, variations in the voltage and current used to generate the radiation in block 406 can result in the radiation image produced by the radiation detector having a variable resolution. In cases where the resolution is below a prescribed value, it can be difficult to detect edges in the radiation image, and the determined distance from the focal spot to the port of the radiation source can be less accurate. As such, when it is determined that the resolution of the radiation image is below the prescribed value, the radiation detector can be re-exposed to radiation generated by the radiation source (e.g., block 406 and subsequent blocks can be repeated). This ensures that the distance between the focal spot and the port is accurately determined.

Figure 5:
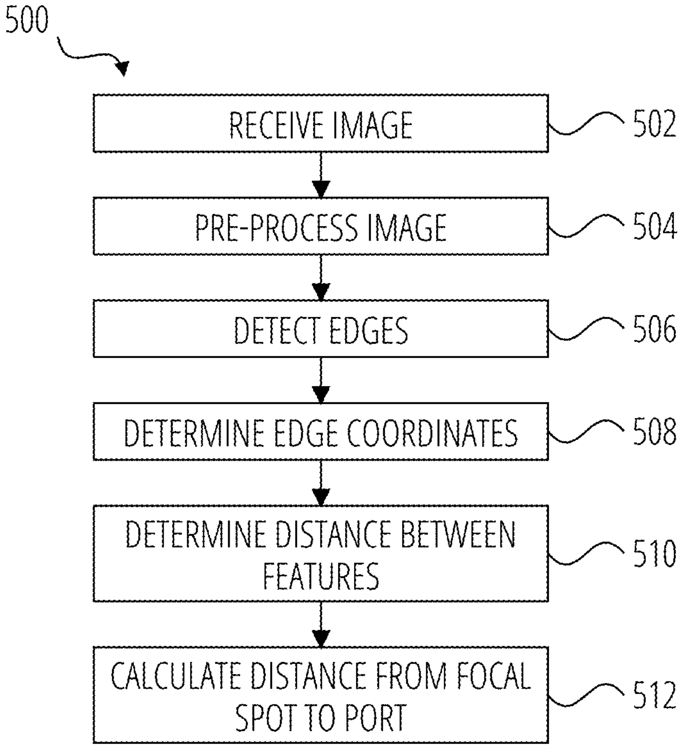
FIG. 5 illustrates a block diagram of a method for determining a distance from a focal spot to a port in an X-ray tube.

FIG. 5 illustrates a block diagram of a method 500 of determining a distance from a focal spot to a port in a radiation source. The distance from the focal spot to the port of a radiation source is the distance between where the point where radiation (e.g., X-rays) is generated, referred to as the focal spot, and the point where the radiation exits the radiation source, referred to as the port. The method 500 can be performed with the system 100 of FIG. 1 and the measurement system 300 of FIGS. 3A through 3G and can produce and utilize the image 200 of FIG. 2A. In one or all examples, the method 500 can be part of the method 400. For example, the method 500 can be used in performing the blocks 408, 410 of the method 400. The method 500 can include a block 502 in which a radiation image is received; a block 504 in which the radiation image is pre-processed; a block 506 in which edges are detected in the radiation image; a block 508 in which coordinates of the edges are determined; a block 516 in which a distance between features in the radiation image is determined; and a block 512 in which the distance from the focal spot to the port is calculated for the radiation source.

In block 502, a radiation image is received. The radiation image can be used to calculate the distance between the focal spot and the port of the radiation source and can be referred to as a calibration image. The radiation image can be received from a radiation detector. In one or all examples, the radiation detector can be a film-based detector, and the radiation image can be converted from an analog X-ray film image into a digital format. The image 200 is an example of the radiation image. The radiation image can be produced by generating radiation from a radiation source, emitting the radiation from a port of the radiation source through a fixture, and detecting the radiation by the radiation detector.

In block 504, pre-processing operations are performed on the radiation image. Pre-processing the radiation image can be used to reduce noise, increase contrast, reduce variation, and the like in the radiation image, while preserving or enhancing edges in the radiation image. A low-pass filter can be applied to the radiation image to smooth the radiation image and reduce noise in the radiation image. A dilution filter or dilated filter can be applied to the radiation image to smooth the radiation image, while maintaining edge definition in the radiation image. The dilated filter can also help to connect broken edges in the radiation image. A Gaussian filter can be applied to the radiation image to reduce noise in the radiation image and blur subtle variations in the radiation image. A bilateral filter can be applied to the radiation image to reduce noise, while preserving edges in the radiation image.

In block 506, edges are detected in the radiation image. The edges in the radiation image can be detected using an edge detection operator or algorithm, such as a Canny edge detector, a Sobel edge detector, a Prewitt edge detector, a Laplacian edge detector, or the like. Specifically, edges of projections (e.g., the projections 208) of elongated bodies (e.g., the rods 132) can be detected in the radiation image (e.g., the image 200). The radiation image can include two projections of two elongated bodies, and two edges of each projection can be detected. Each of the edges of the projections of the elongated bodies can extend generally in a first direction parallel to one another. In block 508, coordinates of the edges can be determined. The coordinates can be determined based on the detected edges of the projections of the elongated bodies.

In block 510, a distance between features in the radiation image is determined. The determined distance can be the distance between centerlines of the projections of the elongated bodies. Based on the determined coordinates of the detected edges, distances between each of the edges can be determined. The distances can be determined in a second direction perpendicular to the first direction. The determined distances can include a distance between a left edge of a left projection and a right edge of the left projection, a distance between the right edge of the left projection and a left edge of a right projection, and a distance between the left edge of the right projection and a right edge of the right projection. These distances can then be used to determine the distance between the centerlines of the projections of the elongated bodies in the radiation image. Equation 1, above, can be used to determine the distance between the centerlines of the projections of the elongated bodies in the radiation image.

In block 512, the distance from the focal spot to the port is calculated for the radiation source. The distance from the focal spot to the port of the radiation source can be calculated based on dimensions of the fixture used to capture the radiation image and the distance determined in block 510. The dimensions of the fixture that can be used to determine the distance from the focal spot to the port of the radiation source can include a distance from the port to centerlines of the elongated bodies (e.g., the distance 136), the distance between the centerlines of the elongated bodies in the fixture (e.g., the distance 134), and the distance between the centerlines of the elongated bodies and the radiation detector (e.g., the distance 138). Equation 2, above, can then be used with the dimensions of the fixture and the determined distance between the centerlines of the left projection of the left elongated body and the right projection of the right elongated body from the radiation image to calculate the distance from the focal spot to the port of the radiation source.

The distance from the focal spot to the port of the radiation source can be calculated accurately, such as with an accuracy greater than about 90%, greater than about 95%, greater than about 98%, or the like. The radiation source can operate with some variation in voltage and current, which can reduce the accuracy of the calculated distance from the focal spot to the port of the radiation source. By accurately determining the distance between the focal spot and the port, the radiation source can be used to provide improved image quality, image sharpness, beam intensity, beam shaping, and beam geometry; reduced blur at edges in images produced by in response to radiation generated by the radiation source; improved patient safety through dose control; minimized patient exposure to radiation; and the like. In one or all examples, each of the blocks of the method 500 can be automated, which can improve both the speed and accuracy of the distance between the focal spot and the port.

In one or all examples, a determination can be made as to the resolution of the radiation image received in block 502. For example, variations in the voltage and current used to generate the radiation used to produce the radiation image can result in the radiation image having a variable resolution. In cases where the resolution is below a prescribed value, it can be difficult to detect edges in the radiation image, and the determined distance from the focal spot to the port of the radiation source can be less accurate. As such, when it is determined that the resolution of the radiation image is below the prescribed value, a new radiation image can be requested. This ensures that the distance between the focal spot and the port is accurately determined.

Figure 6:
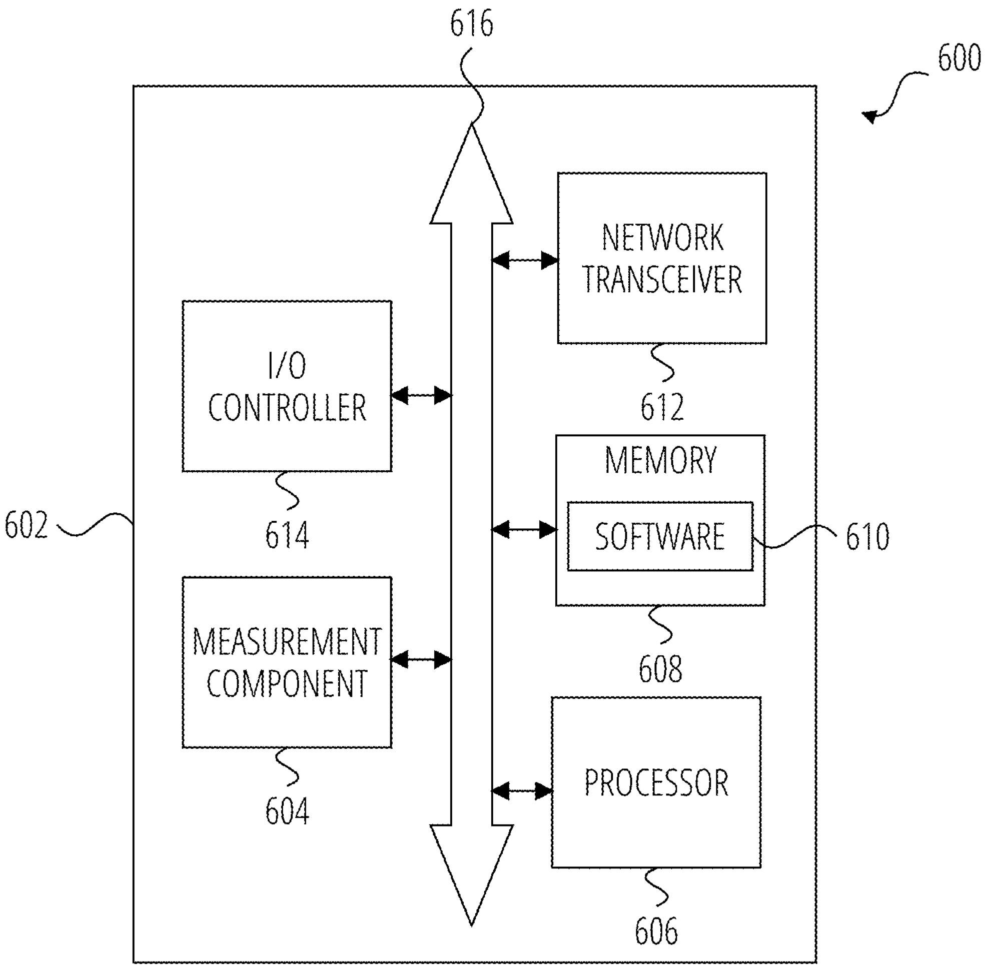
FIG. 6 illustrates a block diagram of a system that supports methods for determining a distance from a focal spot to a port in an X-ray tube.

FIG. 6 illustrates a block diagram of a system 600 including a device 602 that supports methods for determining a distance from a focal spot to a port in an X-ray tube (e.g., the focal spot to port distance 128 of the X-ray tube 102, discussed above with respect to FIGS. 1 through 3G) in accordance with aspects of the present disclosure. The system 600 can perform the methods 400, 500, discussed above with respect to FIGS. 4 and 5, in addition to other or alternative methods and processes. The device 602 can be an example of or include the components of a computer, a computing device, a computing system, or another electronic device. The device 602 can be an example of a portable electronic device, a computer, a laptop computer, a tablet computer, a smartphone, a cellular phone, a wearable device, an internet-connected device, a server, a database, or the like. In one or all examples, the device 602 can be configured for bi-directional wireless communication with other systems or devices using a base station or access point, such as the X-ray detector 108, discussed above with respect to FIGS. 1 through 3G.

The device 602 can include a measurement component 604, a processor 606, a memory 608, software 610, a network transceiver 612, and an I/O controller 614. These components may be in electronic communication with one another via one or more buses (e.g., a bus 616). The device 602 can communicate wirelessly with one or more other devices or computing systems over a network using the network transceiver 612.

The measurement component 604 can implement the measurement and determination functions of the system 100 of FIG. 1 and the methods 400, 500 of FIGS. 4 and 5, in addition to other or alternative methods and processes. The measurement component 604 may be implemented in hardware, software executed by the processor 606, firmware, or any combination thereof. The measurement component 604 can include one or more algorithms or code including instructions executable by the processor 606 to perform the methods 400, 500 of FIGS. 4 and 5. The measurement component 604 can receive a radiation image (e.g., the image 200 received from a radiation detector, such as the X-ray detector 108) and can analyze the radiation image to determine a distance between centerlines of reference features (e.g., the distance 202 between the projections 208 of the rods 132). Based on the distance determined by the measurement component 604 and known or measured dimensions of a fixture (e.g., the fixture 110) used in producing the radiation image, the measurement component 604 can calculate a distance between a focal spot (e.g., the focal spot 104) of a radiation source (e.g., the X-ray tube 102) and a port (e.g., the X-ray detector 108) of the radiation source. By providing the radiation source with the calculated distance (e.g., the focal spot to port distance 128), the radiation source can be used in systems with improved image quality, image sharpness, beam intensity, beam shaping, and beam geometry; reduced blur at edges in images produced by in response to radiation generated by the radiation source; improved patient safety through dose control; minimized patient exposure to radiation; and the like. Moreover, the measurement component 604 can analyze the radiation image automatically, which can improve the accuracy of the distances determined and calculated by the measurement component 604. Further, the measurement component 604 can speed up the process of determining the distances.

The processor 606 can include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). The processor 606 can be configured to execute computer-readable instructions stored in a memory to perform various functions (e.g., image processing functions, including filtering, edge detection, determining coordinates of edges, determining distances between features in an image, calculating distances based on various values, and the like).

The memory 608 can include random access memory (RAM), read only memory (ROM), or the like. The memory 608 can be a volatile memory, a non-volatile memory, or can include both volatile and non-volatile memory. The memory 608 can store images or data acquired by the system 600, such as images received from the X-ray detector 108, values of dimensions of the fixture 110, values determined or calculated by the measurement component 604, and the like. The memory 608 can further store computer-readable, computer-executable software 610 including instructions that, when executed, cause the processor to perform various functions described herein. In one or all examples, the memory 608 can store a basic input/output system (BIOS), which can control interactions with peripheral components or devices.

The software 610 can include code to implement aspects of the present disclosure, including code to support techniques for determining a distance from a focal spot to a port in an X-ray tube and the like. The software 610 can be stored in a non-transitory computer-readable medium such as system memory or other memory. The software 610 can be executable by the processor 606 to perform functions described herein, or can cause a computer (e.g., when compiled and executed) to perform functions described herein.

The network transceiver 612 can communicate bi-directionally, via one or more antennas, wired, or wireless links. For example, the network transceiver 612 can represent a wireless transceiver or wireless communication interface and can communicate bi-directionally with another wireless transceiver. The network transceiver 612 can also include a modem to modulate the packets and provide the modulated packets to the antennas for transmission, and to demodulate packets received from the antennas.

The I/O controller 614 can manage input and output signals for the device 602. The I/O controller 614 can also manage peripherals not integrated into the device 602. In one or all examples, the I/O controller 614 can represent a physical connection or port to an external peripheral. In one or all examples, the I/O controller 614 can utilize an operating system such as iOS®, ANDROID®, MS-DOS®, MS-WINDOWS®, OS/2®, UNIX®, LINUX®, or another operating system. In one or all examples, the I/O controller 614 can represent or interact with a modem, a keyboard, a mouse, a touchscreen, or a similar device. In one or all examples, the I/O controller 614 can be implemented as part of a processor. In one or all examples, a user can interact with the device 602 via the I/O controller 614 or via hardware components controlled by the I/O controller 614.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A method for determining a distance from a focal spot to a port in an X-ray tube, the method comprising:

attaching a fixture to an X-ray tube;

generating X-rays by the X-ray tube to expose an X-ray sensitive material on the fixture to the X-rays through an opening in the fixture; and calculating a distance from a focal spot to a port of the X-ray tube based on a feature of the opening detected by the X-ray sensitive material.

2. The method of claim 1, wherein calculating the distance from the focal spot to the port of the X-ray tube comprises:

detecting a first edge and a second edge of the feature of the opening;

determining a distance between the first edge and the second edge; and calculating the distance from the focal spot to the port of the X-ray tube based on a measured dimension of the fixture and the determined distance between the first edge and the second edge.

3. The method of claim 2, further comprising:

detecting a third edge of the feature; and detecting a fourth edge of the feature;

wherein distances between centerlines of the feature are determined based on the determined distances between the first edge, the second edge, the third edge and the fourth edge; and wherein the distance from the focal spot to the port of the X-ray tube is calculated based on the determined distances between the centerlines of the feature.

4. The method of claim 2, wherein the measured distances of the fixture comprise:

a first offset distance between the X-ray tube and the feature; and a second offset distance between the feature and the X-ray sensitive material.

5. The method of claim 2, wherein:

the feature comprises a pair of elongated bodies; and the measured distances of the fixture comprise a distance between the pair of elongated bodies.

6. The method of claim 1, further comprising:

generating an X-ray image based on the X-rays received by the X-ray sensitive material;

determining a resolution of the X-ray image; and repeating the generating the X-rays in response to the resolution being less than a prescribed value.

7. A non-transitory computer-readable medium storing code for determining a distance from a focal spot to a port in an X-ray tube, the code comprising instructions executable by a processor to:

receive a calibration image from an X-ray detector, the calibration image including a first object and a second object;

detect an edge of the first object;

detect an edge of the second object; and calculate a distance from a focal spot to a port in an X-ray tube based on a distance between the detected edge of the first object and the detected edge of the second object.

8. The non-transitory computer-readable medium of claim 7, wherein:

the code further comprises instructions executable by the processor to determine a distance between centerlines of the first object and the second object in the calibration image based on the detected edge of the first object and the detected edge of the second object; and the distance from the focal spot to the port is calculated based on the distance between the centerlines of the first object and the second object.

9. The non-transitory computer-readable medium of claim 8, wherein:

the detected edge of the first object and the detected edge of the second object extend in a first direction;

the determined distance between the centerlines extends in a second direction perpendicular to the first direction; and the calculated distance from the focal spot to the port extends in a third direction perpendicular to the first direction and the second direction.

10. The non-transitory computer-readable medium of claim 7, further comprising detecting a second edge of the first object and detecting a second edge of the second object in the calibration image.

11. The non-transitory computer-readable medium of claim 10, wherein:

the distance between the centerlines of the first and second object in the calibration image is determined according to an equation:

$$D_1 = 1/2 * D_2 + D_3 + 1/2 * D_4$$

where $D_1$ is the distance between the centerlines of the first and second object, $D_2$ is a distance between the first edge of the first object and the second edge of the first object, $D_3$ is a distance between the second edge of the first object and the first edge of the second object, and $D_4$ is a distance between the first edge of the second object and the second edge of the second object.

12. The non-transitory computer-readable medium of claim 7, wherein calculating the distance from the focal spot to the port in the X-ray tube is further based on dimensions of a fixture used to capture the calibration image.

13. The non-transitory computer-readable medium of claim 7, wherein the code further comprises instructions executable by the processor to apply a filter to the calibration image before detecting the edges in the calibration image.

* * * * *